(12) United States Patent
Golubovic (10) Patent No.: US 10,629,336 B2
(45) Date of Patent: **\*Apr. 21, 2020**

(54) FLEXIBLE POSITIVE TEMPERATURE COEFFICIENT DEVICE WITH BATTERY MANAGEMENT SYSTEM

(71) Applicant: Littelfuse, Inc., Chicago, IL (US)

(72) Inventor: Boris Golubovic, San Francisco, CA (US)

(73) Assignee: Littelfuse, Inc., Chicago, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/677,283

(22) Filed: Aug. 15, 2017

(65) Prior Publication Data

US 2018/0047485 A1 Feb. 15, 2018

Related U.S. Application Data

(60) Provisional application No. 62/375,092, filed on Aug. 15, 2016.

(51) Int. Cl.
| | |
|---|---|
| *H02J 7/00* | (2006.01) |
| *H01C 7/02* | (2006.01) |
| *H02H 7/18* | (2006.01) |
| *H02H 3/08* | (2006.01) |
| *H01M 10/42* | (2006.01) |
| *H02H 1/00* | (2006.01) |

(52) U.S. Cl.
CPC ........ *H01C 7/021* (2013.01); *H01M 10/4207* (2013.01); *H01M 10/4214* (2013.01); *H02H 1/0007* (2013.01); *H02H 3/085* (2013.01); *H02H 7/18* (2013.01); *H02J 7/0026* (2013.01); *H01M 2200/106* (2013.01); *H02J 7/0029* (2013.01); *H02J 7/00304* (2020.01)

(58) Field of Classification Search
CPC ...................................................... H01C 7/021
USPC ........................................................ 320/112
See application file for complete search history.

(56) References Cited

U.S. PATENT DOCUMENTS

| | | | |
|---|---|---|---|
| 5,542,163 A | 8/1996 | Chang | |
| 6,094,129 A * | 7/2000 | Baiatu | H01C 1/08 338/210 |
| 6,362,721 B1 | 3/2002 | Chen et al. | |
| 6,495,069 B1 | 12/2002 | Lussey et al. | |
| 6,501,249 B1 | 12/2002 | Drori | |

(Continued)

OTHER PUBLICATIONS

International Search Report and Written Opinion dated Nov. 6, 2017 in corresponding PCT/US2017/046889.

*Primary Examiner* — Edward Tso
*Assistant Examiner* — Ahmed H Omar (57) ABSTRACT

An electronic device including a protected component, a flexible positive temperature coefficient (PTC) device including a flexible sheet of PTC material coupled to a surface of the protected component, the flexible PTC device electrically connected to the protected component and adapted to arrest or mitigate electrical current flowing through the protected component upon the occurrence of an overcurrent condition, and a battery management system coupled to the flexible PTC device, the battery management system configured to measure a voltage across the flexible PTC device and to arrest or mitigate electrical current in the electronic device if the measured voltage across the flexible PTC device exceeds a predetermined threshold.

8 Claims, 4 Drawing Sheets

(56) References Cited

U.S. PATENT DOCUMENTS

| | | |
|---|---|---|
| 6,713,210 B1 | 3/2004 | Sato et al. |
| 7,059,769 B1 * | 6/2006 | Potega ............... G01R 31/3835 |
| | | 374/185 |
| 2006/0138123 A1 * | 6/2006 | Ishii ........................ H01C 1/01 |
| | | 219/549 |
| 2007/0103269 A1 | 5/2007 | Han et al. |
| 2008/0142497 A1 | 6/2008 | Sorabji et al. |
| 2011/0111296 A1 | 5/2011 | Berdichevsky et al. |
| 2011/0117400 A1 | 5/2011 | Chun |
| 2012/0175362 A1 | 7/2012 | Mikkelsen et al. |
| 2013/0113417 A1 * | 5/2013 | Nakashima ........... H02J 7/0019 |
| | | 320/107 |
| 2013/0202917 A1 | 8/2013 | Tanaka |
| 2014/0146432 A1 | 5/2014 | Wang et al. |
| 2015/0010795 A1 * | 1/2015 | Tanigaki ............. H01M 10/625 |
| | | 429/83 |
| 2016/0093414 A1 | 3/2016 | Ho et al. |
| 2016/0156071 A1 * | 6/2016 | Yamakaji ............ H01M 10/425 |
| | | 429/61 |

* cited by examiner

FLEXIBLE POSITIVE TEMPERATURE COEFFICIENT DEVICE WITH BATTERY MANAGEMENT SYSTEM

CROSS-REFERENCES TO RELATED APPLICATIONS

This application claims the benefit of U.S. Provisional Patent Application No. 62/375,092, filed Aug. 15, 2016, which is incorporated by reference herein in its entirety.

BACKGROUND

Field

The present invention relates generally to positive temperature coefficient (PTC) materials. More specifically, the present invention relates to an ultrathin, flexible sheet formed PTC material.

Description of Related Art

PTC devices are typically used in electronic devices to provide protection against overcurrent and/or overtemperature conditions. PTC material in such devices is selected to have a relatively low resistance within a normal operating temperature range of the electronic, and a high resistance above the normal operating temperature of the electronic device. For example, a PTC device may be connected in electrical series between a battery and a load so that current flowing from the battery to the load flows through the PTC device. The temperature of the PTC device gradually increases as current flowing through the PTC device increases. When the temperature of the PTC device reaches an "activation temperature," the resistance of the PTC device increases sharply. This in-turn sharply reduces the current flowing through the PTC device, thereby protecting the battery and the load from an overcurrent or overtemperature condition.

Existing PTC devices normally include a core material having PTC characteristics surrounded by a package. Conductive pads or conductive leads may be provided on the outside of the package and may be electrically coupled to opposite surfaces of the core material so that current flows through a cross-section of the core material.

Existing PTC materials and devices typically have a thickness of about 200 μm or more which is constrained by conventional manufacturing methods. At such thicknesses, typical PTC materials and devices are too rigid for use in conjunction with applications that may benefit from a PTC material or device having flexible and malleable properties. Such applications include overcurrent and overtemperature protection for batteries in cellular telephones and wearable electronic devices, for example.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of an electronic device in accordance with the present disclosure may include a protected component, a flexible positive temperature coefficient (PTC) device including a flexible sheet of PTC material coupled to a surface of the protected component, the flexible PTC device electrically connected to the protected component and adapted to arrest or mitigate electrical current flowing through the protected component upon the occurrence of an overcurrent condition, and a battery management system coupled to the flexible PTC device, the battery management system configured to measure a voltage across the flexible PTC device and to arrest or mitigate electrical current in the electronic device if the measured voltage across the flexible PTC device exceeds a predetermined threshold.

Another exemplary embodiment of an electronic device in accordance with the present disclosure may include a battery pack comprising a first battery cell and a second battery cell electrically connected to one another so that the battery pack provides a desired electrical output, a flexible positive temperature coefficient (PTC) device including a flexible sheet of PTC material coupled to a surface of the first battery cell and disposed intermediate the first battery cell and the second battery cell, the flexible PTC device electrically connected to the battery pack and adapted to arrest or mitigate electrical current flowing through the battery pack upon the occurrence of an overcurrent condition, and a battery management system coupled to the flexible PTC device, the battery management system configured to measure a voltage across the flexible PTC device and to arrest or mitigate electrical current in the electronic device if the measured voltage across the flexible PTC device exceeds a predetermined threshold.

DETAILED DESCRIPTION

Exemplary embodiments of a flexible sheet of positive temperature coefficient (PTC) material, a device incorporating the flexible sheet, and methods for making the flexible sheet in accordance with the present disclosure will now be described more fully hereinafter with reference to the accompanying drawings. The flexible sheet, device, and methods may, however, be embodied in many different forms and should not be construed as being limited to the embodiments set forth herein. Rather, these embodiments are provided so that this disclosure will convey certain exemplary aspects of the flexible sheet, device, and methods to those skilled in the art.

Figure 1A:
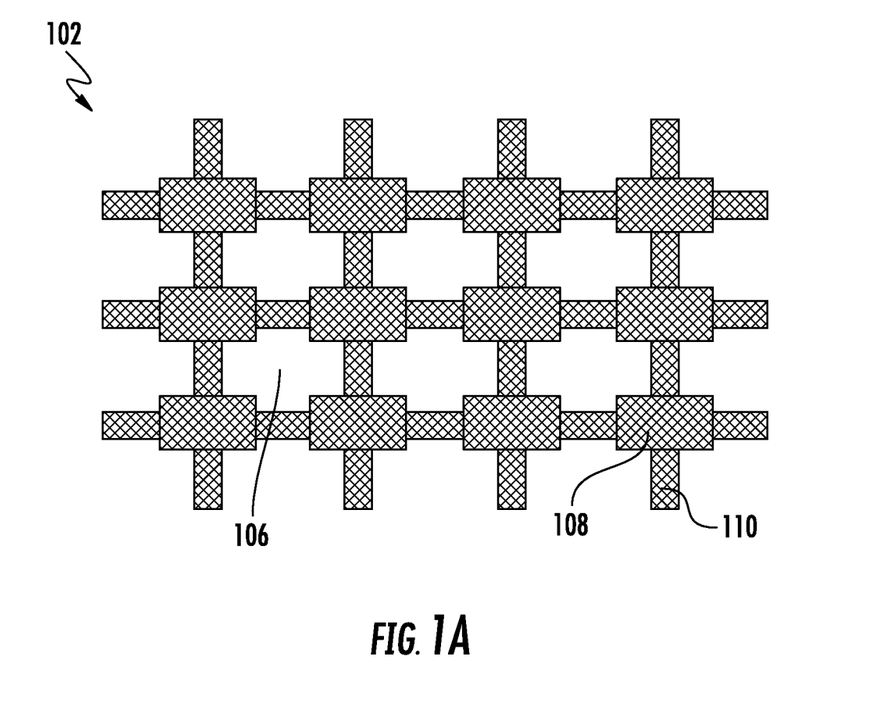
FIG. 1A is a top view illustrating an exemplary embodiment of a flexible sheet of positive temperature coefficient (PTC) material in accordance with the present disclosure.

Referring to FIG. 1A, a top view illustrating a flexible sheet 102 formed of a layer of PTC material in accordance with an exemplary embodiment of the present disclosure is shown. The flexible sheet 102 may have a thickness that is significantly less than that of conventional sheets of PTC material, thus providing the flexible sheet 102 with a flexibility and a malleability that allow the flexible sheet 102 to be wrapped about, and to conform to, the surfaces of other structures and devices (e.g. batteries) while preserving the PTC characteristics of the flexible sheet 102. In a non-limiting example, the flexible sheet 102 may have a thickness in a range of approximately 10 µm to approximately 100 µm. In another non-limiting example, the flexible sheet 102 may have a thickness in a range of approximately 10 µm to approximately 50 µm. In a specific example, the flexible sheet 102 may have a thickness of 25 µm. In another specific example, the flexible sheet 102 may have a thickness of 15 µm.

The flexible sheet 102 may be a perforated, net-like structure formed of a plurality of nodes 108 that are interconnected by a plurality of threads 110 to define a plurality of openings 106. The openings 106, which may improve the flexibility of the flexible sheet 102 relative to a solid, non-perforated sheet, may be formed in the flexible sheet 102 after the flexible sheet 102 is manufactured in the manner described below, such as by punching, cutting, drilling, etching, etc. the flexible sheet 102. The nodes 108 and threads 110 are depicted as being rectangular and linear, respectively, but this is not critical. In various alternative embodiments, the nodes 108 may be circular, triangular, tetrahedral, irregular, etc., and the threads may be curved, zig-zag shaped, etc. without departing from the present disclosure. In some embodiments, greater than 25% of the flexible sheet 102 may be open space defined by the openings 106. In other embodiments, greater than 50% of the flexible sheet 102 may be open space defined by the openings 106. In other embodiments, greater than 75% of the flexible sheet 102 may be open space defined by the openings 106.

Figure 1B:
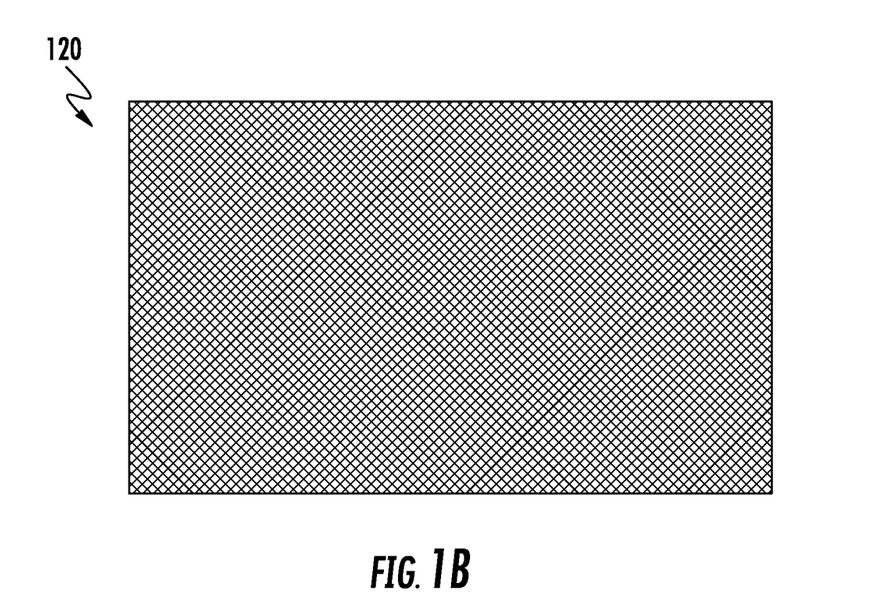
FIG. 1B is a top view illustrating another exemplary embodiment of a flexible sheet of PTC material in accordance with the present disclosure.

Referring to FIG. 1B, a top view illustrating a flexible sheet 120 formed of a layer of PTC material in accordance with an exemplary embodiment of the present disclosure is shown. The flexible sheet 120 may be substantially similar to the flexible sheet 102 described above, but may be formed as a solid layer of PTC material having no perforations or openings formed therein. Like the flexible sheet 102, the flexible sheet 120 may have a thickness that is significantly less than that of conventional sheets of PTC material, thus providing the flexible sheet 120 with a flexibility and a malleability that allow the flexible sheet 120 to be wrapped about, and to conform to, the surfaces of other structures and devices (e.g. batteries) while preserving the PTC characteristics of the flexible sheet 120. In a non-limiting example, the flexible sheet 120 may have a thickness in a range of approximately 10 µm to approximately 100 µm. In another non-limiting example, the flexible sheet 120 may have a thickness in a range of approximately 10 µm to approximately 50 µm. In a specific example, the flexible sheet 120 may have a thickness of 25 µm. In another specific example, the flexible sheet 120 may have a thickness of 15 µm.

Figure 2:
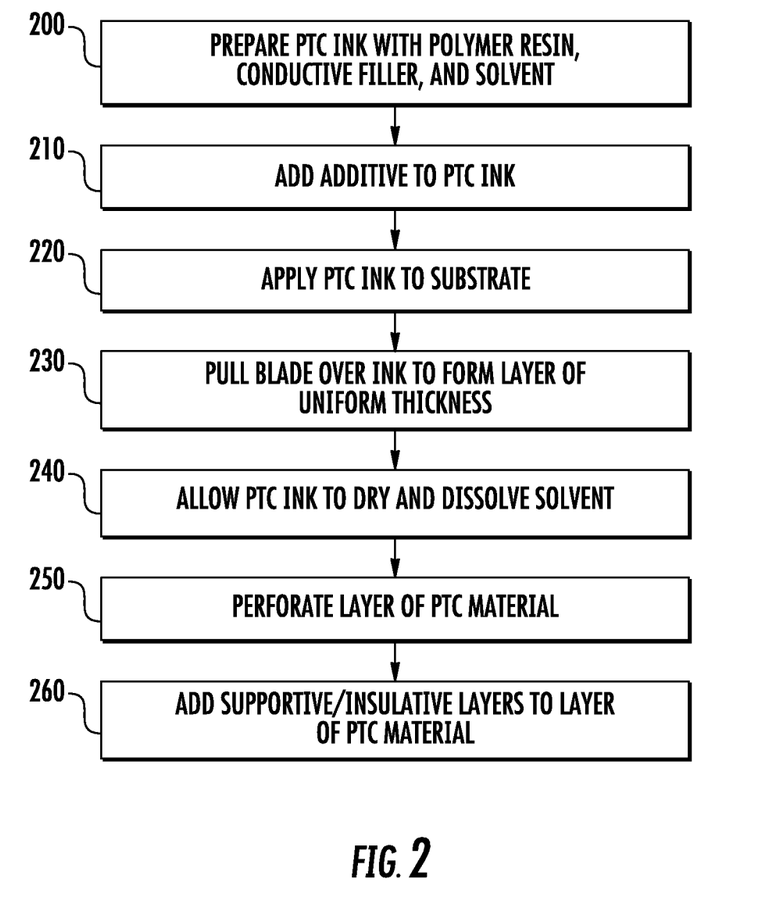
FIG. 2 is a flow diagram illustrating an exemplary method for forming a flexible sheet of PTC material in accordance with the present disclosure.

Referring to FIG. 2, a flow diagram illustrating an exemplary method for forming the above-described flexible sheets 102, 120 of PTC material is depicted. The method described below facilitates the ultra-thin form factor of the flexible sheets 102, 120, which in-turn provides the flexible sheets 102, 120 with flexibility and malleability not found in conventional PTC materials and devices.

In step 200 of the exemplary method shown in FIG. 2, a polymer resin and a conductive filler may be dissolved in a solvent to produce a fluidic, "PTC ink." The polymer resin, which may be provided in pelletized or powdered form, may include particles of semi-crystalline polymer. Examples of semi-crystalline polymers that may be used include, but are not limited to, polyvinylidene difluoride, polyethylene, ethylene tetrafluoroethylene, ethylene-vinyl acetate, ethylene butyl acrylate, and other materials having similar characteristics. The conductive filler may include conductive particles of metal, metal ceramic, carbon, or various other materials selected for specific conductive properties. Specific examples of conductive fillers include, but are not limited to, tungsten carbide, nickel, and titanium carbide. The solvent may be or may include dimethylformamide, N-Methyl-2-pyrrolidone, tetrahydrofuran, tricholorobenzene, dichlorobenzene, dimethylacetamide, dimethyl sulfoxide, cyclohexane, toluene, or a different solvent capable of dissolving or suspending the polymer resin and conductive filler.

In optional step 210 of the exemplary method, an additive, such as an antioxidant, an adhesion promoter, an anti-arcing material, or a different additive, may be added to the PTC ink to improve various characteristics of a flexible sheet (e.g., 102, 120 described above) that will be formed from the PTC ink. Such characteristics may include, but are not limited to, polymer stability, voltage capability, or film adhesion.

In step 220 of the exemplary method, the PTC ink may be applied to a substantially flat surface or substrate. For example, the PTC ink may be poured or sprayed onto a substantially flat surface. In step 230 of the method, a blade may be pulled over the PTC ink, with an edge of the blade disposed parallel to, and spaced a short distance (e.g., 15 µm) above, the surface to produce a uniform layer of PTC ink having a desired thickness. The thickness of the uniform layer of PTC ink may be in a range of approximately 10 µm to approximately 100 µm, for example.

In step 240 of the exemplary method, the PTC ink may be allowed to dry, whereby the solvent may evaporate out of the ink, leaving an ultrathin, solid layer of PTC material similar to the flexible sheet 120 described above. In an optional step 250 of the method, the layer of PTC material may be punched, etched, cut, drilled, etc. to form an ultrathin, perforated sheet of PTC material similar to the flexible sheet 102 described above. In optional step 260 of the method, one or more additional layers of material, including, but not limited to, a flexible supporting film and/or a flexible insulating substrate, may be applied to the layer of PTC material as may be appropriate for a particular application.

Figure 3:
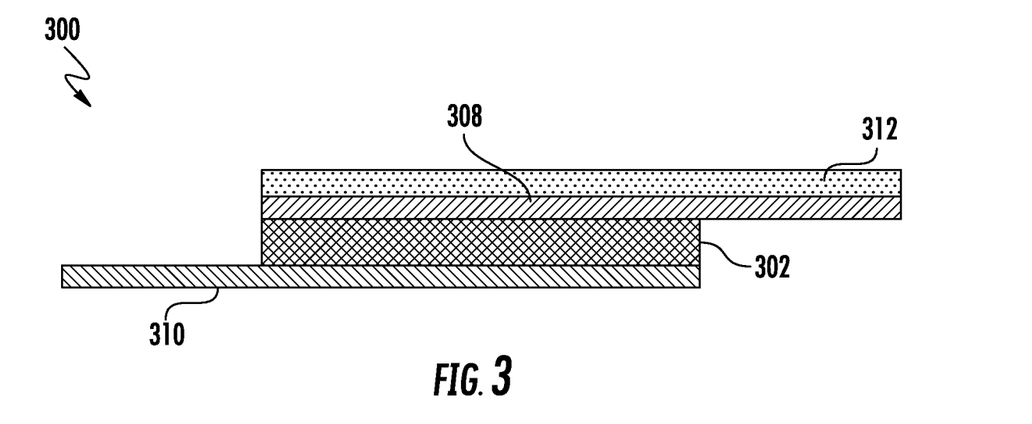
FIG. 3 is a cross sectional view illustrating an exemplary embodiment of a PTC device in accordance with the present disclosure.

Referring to FIG. 3, a cross sectional view of an exemplary PTC device 300 that includes an ultrathin, flexible sheet 302 of PTC material in accordance with the present disclosure is shown. The flexible sheet 302 may be substantially identical to either of the perforated or solid flexible sheets 102, 120 described above. Particularly, the flexible sheet 302 may be flexible and malleable and may have a thickness in a range of approximately 10 µm to approximately 100 µm. In a specific example, the flexible sheet 302 may have a thickness of 25 µm. In another specific example, the flexible sheet 302 may have a thickness of 15 µm.

The PTC device 300 may further include first and second layers of flexible, conductive foil or metallized polyamide material 308, 310 (hereinafter "the first conductive foil 308" and "the second conductive foil 310," respectively) that may be coupled to opposing planar surfaces of the flexible sheet 302. The first and second conductive foils 308, 310 may be formed of copper, nickel, or the like, for example. The conductive foils 308, 310 may act as thermal contact layers that provide the PTC device 300 with enhanced thermal conductivity. The conductive foils 308, 310 may also extend from the flexible sheet 302 and may serve as electrical leads for facilitating electrical connection of the PTC device 300 between an source of electrical energy and a load as further described below. In various embodiments, one or both of the conductive foils 308, 310 may be provided with an electrically insulating substrate or covering 312 coupled thereto for preventing inadvertent electrical contact with surrounding devices or structures.

Figure 4:
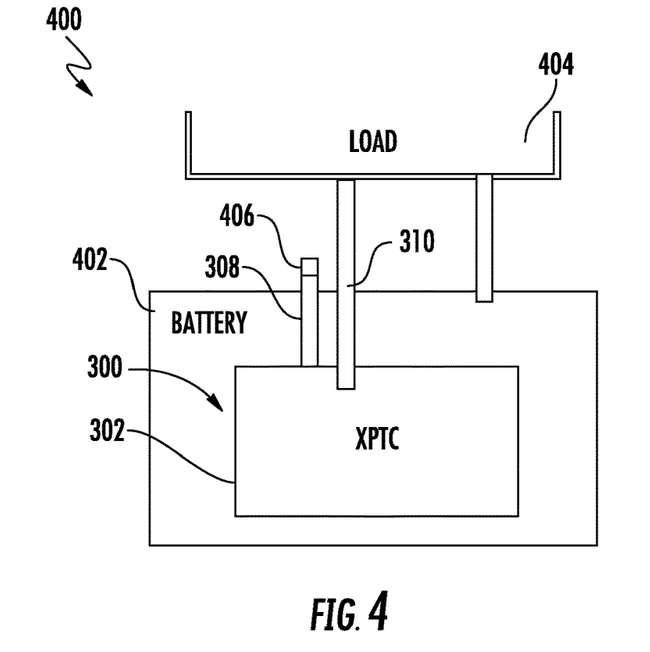
FIG. 4 is a schematic view illustrating an exemplary embodiment of an electronic device in accordance with the present disclosure.

Referring to FIG. 4, a schematic illustration of an exemplary electronic device 400 implementing the above-described PTC device 300 is shown. The electronic device 400 may include one or more components (hereinafter "the protected component") that may be protected by the PTC device 300. In the exemplary embodiment shown in FIG. 4, the protected component is a battery or pack of batteries 402 (hereinafter collectively referred to as "the battery 402"). The present disclosure is not limited in the regard, and it is contemplated that the protected component may alternatively be, or may alternatively include, any of a variety of electrical power sources and/or electrical devices that may benefit from overcurrent or overtemperature protection.

In various examples, the battery 402 may be a Li-ion battery, a Li-Polymer battery, a Ni-MH rechargeable battery, or the like. While the battery 402 is shown as being generally rectangular, that battery may, in various embodiments, have a variety of other shapes (e.g., cylindrical, irregular) as may be suitable for a particular application. Additionally, the battery 402 may, in various embodiments, be flexible, such as may be suitable for use in flexible, wearable electronic devices.

The PTC device 300 may be coupled to the battery in a conforming relationship with an exterior surface thereof. The flexible sheet 302 is schematically shown as covering a portion of a front surface of the battery 402, but in various alternative embodiments that flexible sheet may cover a majority of, or an entirety of, an exterior surface of the battery 402. In some examples, the flexible sheet 302 may cover less than 25% of an exterior surface of the battery 402. In other examples, the flexible sheet 302 may cover greater than 25% of an exterior surface of the battery 402. In other examples, the flexible sheet 302 may cover greater than 50% of the exterior surface of the battery 402. In further examples, the flexible sheet 302 may cover greater than 75% of the exterior surface of the battery 402. In some examples, the flexible sheet 302 may be wrapped, bent, or shaped around edges, corners, contours, and other surface features of the battery 402 in a conforming or substantially conforming relationship therewith (e.g., in flat or continuous contact therewith). In various examples, the PTC device may be coupled to the battery 402 using ultrasonic welding, laser or plasma cleaning and clamping, conductive epoxy, various other conductive or non-conductive adhesives, etc. The present disclosure is not limited in this regard.

The PTC device 300 may be configured to sense an overcurrent or overtemperature condition in the battery 402 and to arrest or mitigate current flowing to or from the battery upon the occurrence of such a condition. For example, the PTC device 300 may be connected in electrical series between the battery 402 and an electrical load 404 (e.g., an electrical circuit in a wearable electronic device, a cellular telephone, etc.) that is powered by the battery 402. For example, the first conductive foil 308 of the PTC device 300 may be connected to a positive or negative terminal 406 of the battery 402, and the second conductive foil 310 of the PTC device 300 may be connected to the electrical load 404. Thus, the PTC device 300 may operate to prevent or mitigate damage to the load 404 and/or the battery 402 that might otherwise result from an overcurrent or overtemperature condition in the electronic device 400. For example, upon the occurrence of an overcurrent or overtemperature condition in the electronic device 400, the temperature of the battery 402 (or a portion of the battery 402) may increase, causing the temperature of the adjacent flexible sheet 302 to increase. When the temperature of the flexible sheet 302 reaches an "activation temperature," the resistance of the PTC material from which the flexible sheet 302 is formed may increase sharply. This in-turn arrests or mitigates the current flowing through the flexible sheet 302 and between the battery 402 and the load 404, thereby protecting the battery 402 and the load 404 from the overcurrent condition. When overcurrent condition subsides, the temperatures of the battery 402 and the flexible sheet 302 may decrease below the activation temperature, and current may again be allowed to flow between the battery 402 and the load 404 as during normal operation.

Figure 5:
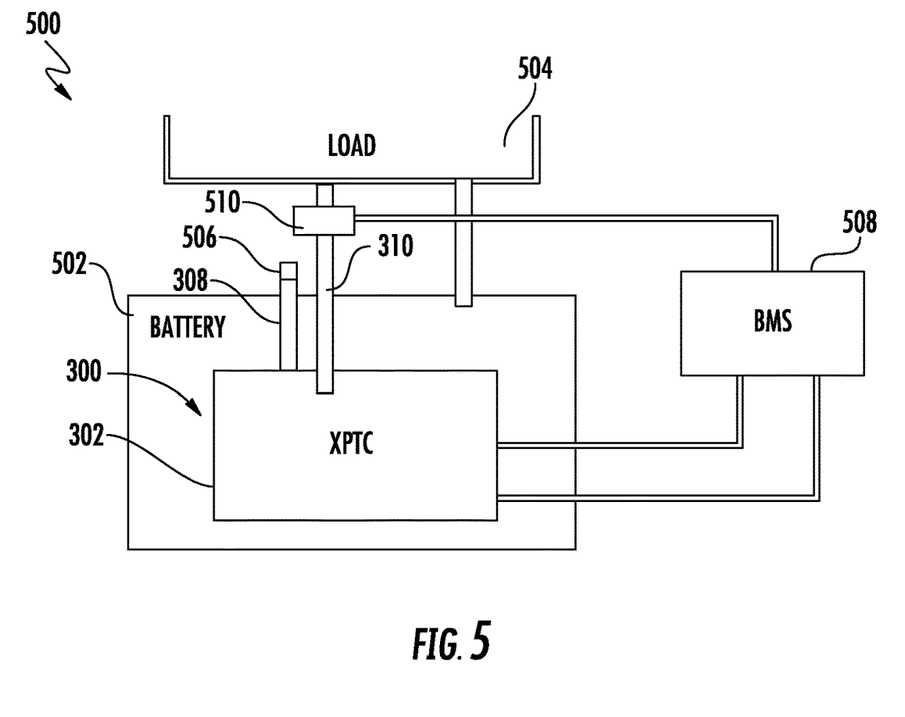
FIG. 5 is a schematic view illustrating another exemplary embodiment of an electronic device in accordance with the present disclosure.

Referring to FIG. 5, a schematic illustration of another exemplary electronic device 500 implementing the above-described PTC device 300 is shown. The electronic device 500 may be similar to the electronic device 400 described above, and may include one or more components (hereinafter "the protected component") that may be protected by the PTC device 300. In the exemplary embodiment shown in FIG. 5, the protected component is a battery or pack of batteries 502 (hereinafter collectively referred to as "the battery 502"). The present disclosure is not limited in the regard, and it is contemplated that the protected component may alternatively be, or may alternatively include, any of a variety of electrical power sources and/or electrical devices that may benefit from overcurrent or overtemperature protection.

In various examples, the battery 502 may be a Li-ion battery, a Li-Polymer battery, a Ni-MH rechargeable battery, or the like. While the battery 502 is shown as being generally rectangular, that battery may, in various embodiments, have a variety of other shapes (e.g., cylindrical, irregular) as may be suitable for a particular application. Additionally, the battery 502 may, in various embodiments, be flexible, such as may be suitable for use in flexible, wearable electronic devices.

The PTC device 300 may be coupled to the battery in a conforming relationship with an exterior surface thereof. The flexible sheet 302 is schematically shown as covering a portion of a front surface of the battery 502, but in various alternative embodiments the flexible sheet 302 may cover a majority of, or an entirety of, an exterior surface of the battery 502. In some examples, the flexible sheet 302 may cover less than 25% of an exterior surface of the battery 502. In other examples, the flexible sheet 302 may cover greater than 25% of an exterior surface of the battery 502. In other examples, the flexible sheet 302 may cover greater than 50% of the exterior surface of the battery 502. In further examples, the flexible sheet 302 may cover greater than 75% of the exterior surface of the battery 502. In some examples, the flexible sheet 302 may be wrapped, bent, or shaped around edges, corners, contours, and other surface features of the battery 502 in a conforming or substantially conforming relationship therewith (e.g., in flat or continuous contact therewith). In various examples, the PTC device 300 may be coupled to the battery 502 using ultrasonic welding, laser or plasma cleaning and clamping, conductive epoxy, various other conductive or non-conductive adhesives, etc. The present disclosure is not limited in this regard.

The PTC device 300 may be configured to sense an overcurrent or overtemperature condition in the battery 502 and to arrest or mitigate current flowing to or from the battery upon the occurrence of such a condition. For example, the PTC device 300 may be connected in electrical series between the battery 502 and an electrical load 504 (e.g., an electrical circuit in a wearable electronic device, a cellular telephone, etc.) that is powered by the battery 502. For example, the first conductive foil 308 of the PTC device 300 may be connected to a positive or negative terminal 506 of the battery 502, and the second conductive foil 310 of the PTC device 300 may be connected to the electrical load 504. Thus, the PTC device 300 may operate to prevent or mitigate damage to the load 504 and/or the battery 502 that might otherwise result from an overcurrent or overtemperature condition in the electronic device 500. For example, upon the occurrence of an overcurrent or overtemperature condition in the electronic device 500, the temperature of the battery 502 (or a portion of the battery 502) may increase, causing the temperature of the adjacent flexible sheet 302 to increase. When the temperature of the flexible sheet 302 reaches an "activation temperature," the resistance of the PTC material from which the flexible sheet 302 is formed may increase sharply. This in-turn arrests or mitigates the current flowing through the flexible sheet 302 and between the battery 502 and the load 504, thereby protecting the battery 502 and the load 404 from the overcurrent condition. When the overcurrent condition subsides, the temperatures of the battery 502 and the flexible sheet 302 may decrease below the activation temperature, and current may again be allowed to flow between the battery 502 and the load 504 as during normal operation.

The electronic device 500 may further include an active battery management system (BMS) 508 that may be configured to monitor various operating parameters (e.g., temperature, voltage, etc.) of the battery 502 and to regulate operation of the battery 502 according to such monitored parameters as further described below. The BMS 508 may be coupled to the battery 502, the PTC device 300, and a high voltage disconnect switch (HVDS) 510 that may be connected in electrical series intermediate the battery 502 and the load 504. For example, the HVDS 510 may be connected to the second conductive foil 310 of the PTC device and to the electrical load 504 as shown in FIG. 5. The present disclosure is not limited in this regard.

In some embodiments, the BMS 508 may be implemented using a microprocessor or other form of computing device (e.g., an application specific computer processor or the like) that is an integral or on-board component of the load 504. In other embodiments, the BMS 508 may be located external to the load 504. The BMS 508 may be configured to monitor a resistance of the PTC device 300 and to determine a temperature of the battery 502 therefrom. For example, if the BMS 508 measures a relatively low voltage in the PTC device 300, the BMS 508 may determine that the resistance of the PTC device 300, and therefore the temperatures of the PTC device 300 and the adjacent battery 502, are relatively low and within a normal, safe operating range. However, if the BMS 508 measures a relatively high voltage or a rapid increase in voltage in the PTC device 300, the BMS 508 may determine that the resistance of the PTC device 300, and therefore the temperatures of the PTC device 300 and the adjacent battery 502, are relatively high. The increased temperature may result from exposure to an external heat source (e.g., the electronic device 500 sitting out in the sun), or from an internal fault in the battery 502. In any case, if the BMS 508 determines that the temperature of the battery is above a predetermined threshold, the BMS 508 may reduce or arrest the flow of electrical current in the electronic device 500. For example, the BMS 508 may open the HVDS 510.

In a non-limiting example, the BMS 508 may be configured to mitigate or arrest current in the electronic device 500 if the BMS determines that the PTC device 300 reaches a temperature that corresponds to a current carrying capacity of the PTC device 300 (e.g., 300 Amps). Thus, the BMS 508 may operate to mitigate and arrest large currents that are in excess of the capacity of the PTC device 300, thereby providing superior overcurrent protection relative to conventional PTC overcurrent protection devices.

Figure 6:
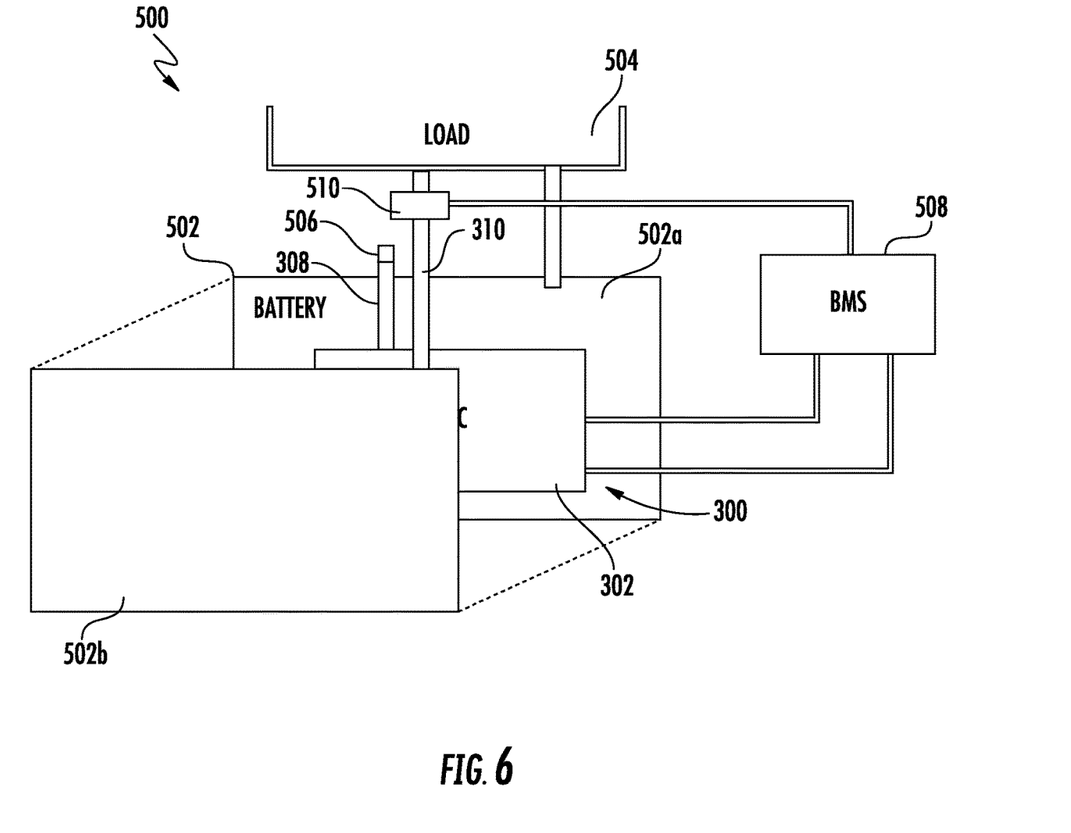
FIG. 6 is a schematic view illustrating another exemplary embodiment of an electronic device in accordance with the present disclosure.

Referring to FIG. 6, a schematic illustration of an alternative embodiment of the electronic device 500 is shown in which the battery 502 includes a first battery cell 502a and a second battery cell 502b. The first and second battery cells 502a, b may be electrically coupled to one another in order to achieve a desired voltage and current output, for example. The second battery cell 502b, which is shown in FIG. 6 exploded away from the first battery cell 502a for clarity, may be disposed in a stacked arrangement with, and in intimate contact with, the first battery cell 502a, with the PTC device 300 sandwiched therebetween. Thus, the PTC device 300 may be sensitive to temperature increases in both the first battery cell 502a and the second battery cell 502b, and the BMS 508 may operate to monitor the temperatures of the first and second battery cells 502a, b via the PTC device 300 and may mitigate or arrest current in the electronic device 500 upon the occurrence of an overtemperature condition in the manner described above.

While the battery 502 in FIG. 6 is shown as having two battery cells 502a, b, various embodiments of the electronic device 500 are contemplated in which the battery includes three or more battery cells disposed in a stacked arrangement, with additional PTC devices disposed between each pair of adjacent battery cells and operatively connected to the BMS 508 to facilitate temperature monitoring of the additional battery cells in the same manner as the PTC device 300 as described above.

Those of ordinary skill in the art will appreciate numerous advantages provided by the above-described ultrathin, flexible sheets 102, 120, and 302 as implemented in a PTC device (e.g., the above-described PTC device 300) and in conjunction with an active battery management system as in the electronic device 500 described above. For example, since the flexible sheets 102, 120, and 302 are flexible and malleable, the flexible sheets 102, 120, and 302 may flex, bend, expand, and contract to accommodate flexing, bending, thermal expansion, and thermal contraction of an underlying battery (or plurality of battery cells). Furthermore, since the flexible sheets 102, 120, and 302 can be wrapped about, or otherwise disposed on, an entire exterior surface (or a majority of an exterior surface) of a battery, the flexible sheets 102, 120, and 302 may be effective for sensing temperature increases over a much greater surface area of a battery relative to point sensors that are used in conventional overcurrent/overtemperature protection devices and that only sense temperatures on small, discrete points or portions on an exterior of a battery. Still further, since the flexible sheets 102, 120, and 302 are extremely thin relative to conventional PTC materials and devices, the flexible sheets 102, 120 may be implemented in applications that require small, slim, or low-profile form factors (e.g., wearable devices, cell phones, etc.) while still providing robust overcurrent/overtemperature protection.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

I claim:

1. An electronic device comprising:
a battery pack comprising a first battery cell, a second battery cell, and a third battery cell electrically connected to one another so that the battery pack provides a desired electrical output;
a flexible positive temperature coefficient (PTC) device including a first flexible sheet of PTC material coupled to a surface of the first battery cell and disposed intermediate the first battery cell and the second battery cell, a second flexible sheet of PTC material coupled to a surface of the second battery cell and disposed intermediate the second battery cell and the third battery cell, the flexible PTC device electrically connected to the battery pack and adapted to arrest or mitigate electrical current flowing through the battery pack upon occurrence of an overcurrent condition, wherein the first flexible sheet of PTC material covers greater than 25% of the surface of the first battery cell; and
a battery management system coupled to the flexible PTC device, the battery management system configured to measure a voltage across the flexible PTC device and to arrest or mitigate electrical current in the electronic device if the measured voltage across the flexible PTC device exceeds a predetermined threshold.

2. The electronic device of claim 1, wherein the flexible PTC device is connected electrically in series between the battery pack and an electrical load.

3. The electronic device of claim 2, wherein the battery management system is an on-board component of the electrical load.

4. The electronic device of claim 2, further comprising a disconnect switch operatively connected to the battery management system and electrically connected in series between the flexible PTC device and the electrical load, the battery management system configured to open the disconnect switch if the measured voltage across the flexible PTC device exceeds a predetermined threshold.

5. The electronic device of claim 1, wherein the first flexible sheet of PTC material has a thickness in a range of 10 μm to 100 μm.

6. The electronic device of claim 1, wherein the first flexible sheet of PTC material covers greater than 50% of the surface of the first battery cell.

7. The electronic device of claim 1, wherein the first flexible sheet of PTC material covers greater than 75% of the surface of the first battery cell.

8. The electronic device of claim 1, wherein the battery management system is configured to arrest or mitigate electrical current in the electronic device if a current flowing through the flexible PTC device exceeds a current carrying capacity of the flexible PTC device.

* * * * *